(12) United States Patent
Zhang et al.

(10) Patent No.: US 9,644,351 B2
(45) Date of Patent: May 9, 2017

(54) INLET WATER PIPE

(71) Applicant: Xiamen Runner Industrial Corporation, Xiamen (CN)

(72) Inventors: Ronggui Zhang, Xiamen (CN); Xianhai Lin, Xiamen (CN); Ximin Chen, Xiamen (CN)

(73) Assignee: XIAMEN RUNNER INDUSTRIAL CORPORATION, Xiamen (CN)

( * ) Notice: Subject to any disclaimer, the term of this patent is extended or adjusted under 35 U.S.C. 154(b) by 0 days.

(21) Appl. No.: 14/834,080

(22) Filed: Aug. 24, 2015

(65) Prior Publication Data

US 2016/0090718 A1    Mar. 31, 2016

(30) Foreign Application Priority Data

Sep. 30, 2014   (CN) .......................... 2014 1 0517794

(51) Int. Cl.
| | |
|---|---|
| *F16K 21/00* | (2006.01) |
| *E03C 1/02* | (2006.01) |
| *F16L 11/20* | (2006.01) |
| *F16L 33/22* | (2006.01) |
| *F16L 39/00* | (2006.01) |
| *F16L 39/02* | (2006.01) |
| *F16L 9/19* | (2006.01) |

(52) U.S. Cl.
CPC ............... *E03C 1/025* (2013.01); *F16L 9/19* (2013.01); *F16L 11/20* (2013.01); *F16L 33/224* (2013.01); *F16L 39/005* (2013.01); *F16L 39/02* (2013.01)

(58) Field of Classification Search
CPC ... E03C 1/025; F16L 9/19; F16L 11/20; F16L 39/005; F16L 39/02; F16L 33/224; Y10T 137/87249
USPC ......................................... 285/28, 120.1, 25
See application file for complete search history.

(56) References Cited

U.S. PATENT DOCUMENTS

| | | | | |
|---|---|---|---|---|
| 3,980,112 A | * | 9/1976 | Basham .................... | B67D 7/54 141/392 |
| 4,067,596 A | * | 1/1978 | Kellner ................. | E21B 17/042 175/215 |
| 4,754,782 A | * | 7/1988 | Grantham ............. | F16L 39/005 138/109 |
| 5,005,613 A | * | 4/1991 | Stanley ................ | B67D 7/0478 138/109 |

(Continued)

FOREIGN PATENT DOCUMENTS

| | | | | | |
|---|---|---|---|---|---|
| FR | 1065308 | A | * | 5/1954 | ............. F16L 11/20 |
| GB | 2110331 | A | * | 6/1983 | ............. E03C 1/021 |

*Primary Examiner* — Jessica Cahill
(74) *Attorney, Agent, or Firm* — Chun-Ming Shih

(57) ABSTRACT

An inlet water pipe includes a first pipe, and a second pipe mounted into the first pipe. A first channel transporting first liquid is formed through the first pipe. A second channel transporting second liquid is formed between the first pipe and the second pipe. A connecting sleeve is hollow and is mounted around a front end of the first pipe. A valve core is mounted on a front end of the connecting sleeve, and having a center hole centrally and axially formed through the valve core and multiple water outlets formed in a periphery of the valve core and communicating with the second pipe. The inlet water pipes gathers two different waterways in one inlet pipe and allow easy connection with faucet, and ensures good hermetic seal.

3 Claims, 2 Drawing Sheets

(56) References Cited

U.S. PATENT DOCUMENTS

| | | | | |
|---|---|---|---|---|
| 5,259,651 A | * | 11/1993 | Sharp | F16L 39/005 |
| | | | | 285/123.1 |
| 5,285,744 A | * | 2/1994 | Grantham | B67D 7/0478 |
| | | | | 138/113 |
| 5,449,113 A | * | 9/1995 | Bruckelmyer | F16L 11/20 |
| | | | | 237/1 R |
| 5,913,336 A | * | 6/1999 | Ingram | F16L 39/02 |
| | | | | 138/109 |
| 5,931,184 A | * | 8/1999 | Armenia | F16L 39/005 |
| | | | | 137/312 |
| 8,002,313 B2 | * | 8/2011 | Singh | A61M 1/0088 |
| | | | | 285/121.3 |

* cited by examiner

INLET WATER PIPE

BACKGROUND OF THE INVENTION

Field of the Invention

The present invention relates to a water pipe and, more particularly, to an inlet water pipe simultaneously supplying two types of fluid.

Description of the Related Art

Having one water path connected to all faucets in the kitchen is commonplace these days. Such water path usually supplies running water and fails to supply running water and filtered water at same time.

However, filtered water are also used frequently. If installation of both running water faucet and filtered water faucet are needed, not only more space but also higher cost are the concern.

SUMMARY OF THE INVENTION

In view of the problems and drawbacks of the prior art, the objective of the present invention is to provides an inlet water pipe with compact structure for supply of two kinds of liquid.

To achieve the foregoing objective, the inlet water pipe includes a first pipe, a second pipe, a connecting sleeve and a valve core.

The second pipe is mounted around by the first pipe, and has a first channel formed through the second pipe for first liquid to flow through the first channel. A second channel is formed between the first pipe and the second pipe for second liquid to flow through the second channel;

The connecting sleeve is hollow, and is mounted around a front end of the first pipe.

The valve core is mounted on a front end of the connecting sleeve, and has a center hole and multiple water outlets.

The center hole is centrally and axially formed through the valve core for the second pipe to pass through the center hole with hermetic seal formed between the second pipe and the center hole.

The multiple water outlets are formed in a periphery of the valve core, and communicate with the second pipe.

When compared to conventional techniques, the present invention has the following advantages, namely, two waterways for two different kinds of liquid combined in a same inlet water pipe, compact structure, convenient operation, easy connection with faucet, and good hermetic seal.

According to the foregoing description, the present invention has the advantages of a simplified structure to made two difference waterway gather to one inlet channel is convenience to used.

BRIEF DESCRIPTION OF THE DRAWINGS

The detailed description of the drawings particularly refers to the accompanying figures in which.

DETAILED DESCRIPTION OF THE INVENTION

The purpose, construction, features, functions and advantages of the present invention can be appreciated and understood more thoroughly through the following detailed description with reference to the attached drawings.

Figure 1:
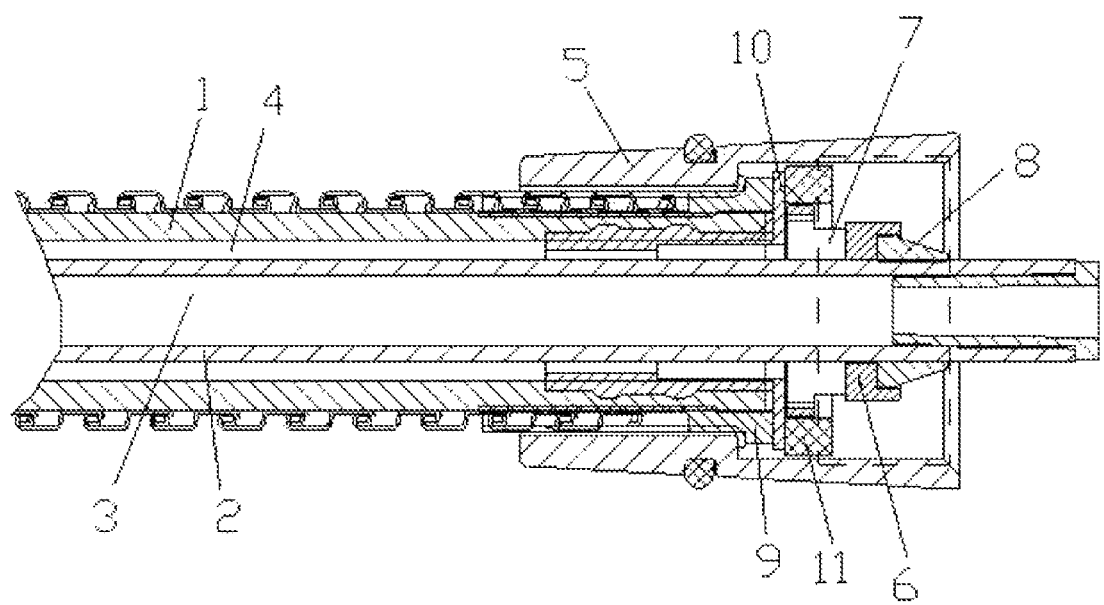
FIG. 1 is a partial cross-sectional view of the inlet water pipe in accordance with the present invention.
Figure 2:
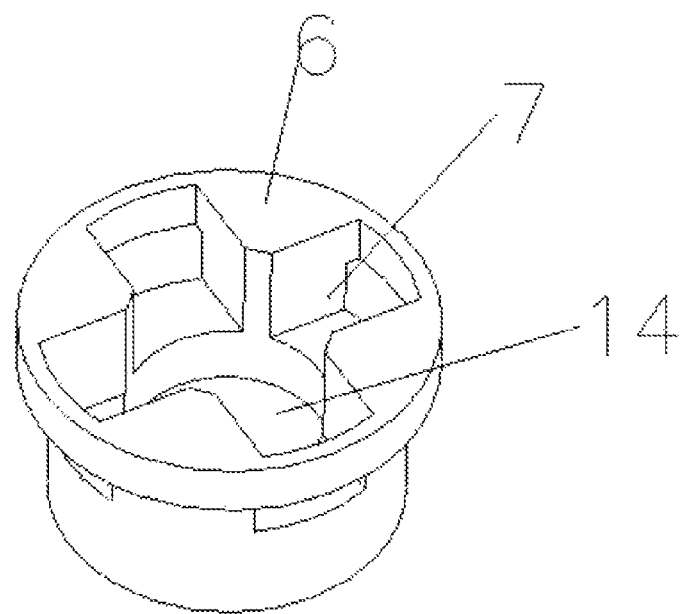
FIG. 2 is a perspective view of a valve core of the inlet water pipe in FIG. 1.
Figure 3:
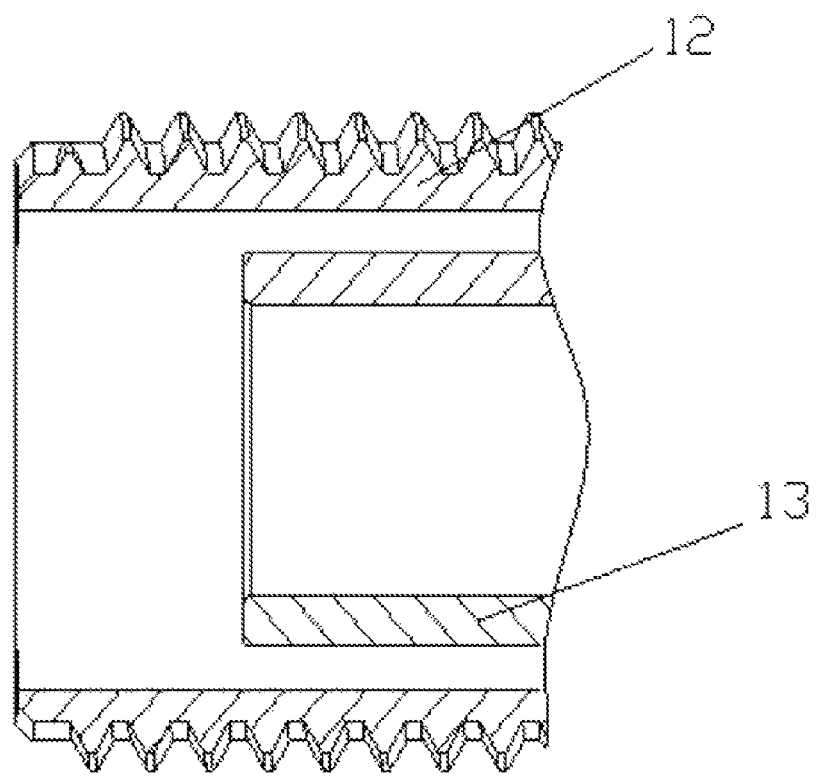
FIG. 3 is a partial cross-sectional view of a water inlet of a pull-out faucet connected to an inlet end of the inlet water pipe in FIG. 1.

With reference to FIGS. 1-3, an inlet water pipe in accordance with the present invention includes a first pipe 1, a second pipe 2, a connecting sleeve 5, a valve core 6 and a positioning plate 10.

The second pipe 2 is mounted around by the first pipe 1, and has a first channel 3 formed through the second pipe 2 for first liquid to flow through the first channel 3. A second channel 4 is formed between the first pipe 1 and the second pipe 2 for second liquid to flow through the second channel 4.

The first liquid may be filtered water, and the second liquid may be running water. The connecting sleeve 5 is hollow and is mounted around a front end of the first pipe 1, the inside of the connecting sleeve 5 is stair-shaped with a big hole at a front end and a small hole at a rear end of the connecting sleeve 5. The big hole is located at the front end thereof and internally threaded, and the small hole located at the rear end thereof. The first pipe 1 has a flange 9 mounted around a rear end of the first pipe 1 and engaging a stair-shaped portion inside connecting sleeve 5.

The valve core 6 is mounted on the front end of the connecting sleeve 5, and has a center hole 14 centrally and axially formed through the valve core 6 and multiple water outlets 7 formed in a periphery of the valve core 6 and communicating with the center hole 14 and the second channel 4. The second pipe 2 is mounted through the center hole 14 of the valve core 6, and the second pipe 2 and the valve core 6 are hermetically sealed through a first collar seal 8. The first collar seal 8 is conical with a small end facing the front end of the connecting sleeve 5, and is mounted between a front portion of the valve core 6 and a periphery of the second pipe 2.

The positioning plate 10 is annular, and is mounted on the front end of the first pipe 1. A second collar seal 11 is mounted around the periphery of the valve core 6 and contacting a front side of the positioning plate 10.

As shown in FIG. 3, the water inlet of the faucet is connected to an outlet end of the inlet water pipe of the present invention and has an external adapter 12 and an internal adapter 13. The external adapter 12 is externally threaded and is connected with the connecting sleeve 5 by threaded connection. The internal adapter 13 is mounted inside the external adapter 12 and is connected to a filtered waterway in the faucet. An annular space between the external adapter 12 and the internal adapter 13 is connected to a running waterway.

The external adapter 12 is externally thread and is connect with the connecting sleeve 5 by thread connection. Turn and tighten the connecting sleeve 5, the connecting sleeve 5 move right. At same time, the left side of the connecting sleeve 5 abut against on the flange 9. Continue turn the connecting sleeve 5 drive the flange 9 compact the external adapter 12.

When the inlet water pipe is connected with the water inlet of the faucet, the flange 9 is used to push the first pipe 1 to connect with the external adapter 12, the second pipe 2 is connected with the internal adapter 13 such that an end portion of the external adapter 12 squeezes the second collar seal 11 to form hermetic seal between the external adapter 12 and the first tube 1, and an end portion of the internal adapter 13 squeezes the first collar seal 8 for form hermetic seal between the internal adapter 13 and the second pipe 2.

What is claimed is:

1. A inlet water pipe, comprising:
a first pipe;

a second pipe surrounded by the first pipe, and having a first channel formed through the second pipe for first liquid to flow through the first channel, wherein a second channel is formed between the first pipe and the second pipe for second liquid to flow through the second channel;

a connecting sleeve being hollow, and surrounding a front end of the first pipe; and a valve core mounted on a front end of the connecting sleeve, and having:

a center hole centrally and axially formed through the valve core for the second pipe to pass through the center hole with hermetic seal formed between the second pipe and the center hole; and multiple water outlets formed in a periphery of the valve core, and communicating with the second pipe, wherein an inside of the connecting sleeve is stair-shaped with a first hole at the front end and a second hole at a rear end of the connecting sleeve, wherein the first hole is internally threaded, and the first pipe has a flange surrounding a rear end of the first pipe and engaging a stair-shaped portion inside the connecting sleeve.

2. The inlet water pipe as claimed in claim 1, wherein a first collar seal is conical and is mounted between a front portion of the valve core and a periphery of the second pipe to form hermetic seal between the valve core and the second pipe.

3. The inlet water pipe as claimed in claim 2, wherein a second collar seal is surrounding the periphery of the valve core and contacts a front side of a positioning plate.

* * * * *